Figure 3:
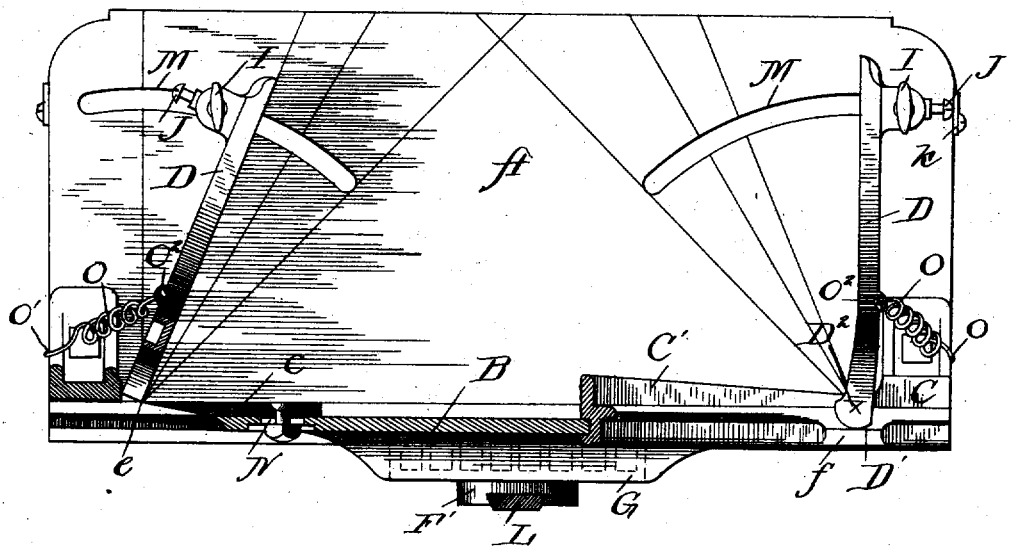

2 Sheets—Sheet 1.
W. R. FOX.
MITER CUTTING MACHINE.
No. 11,062. Reissued Feb. 25, 1890.
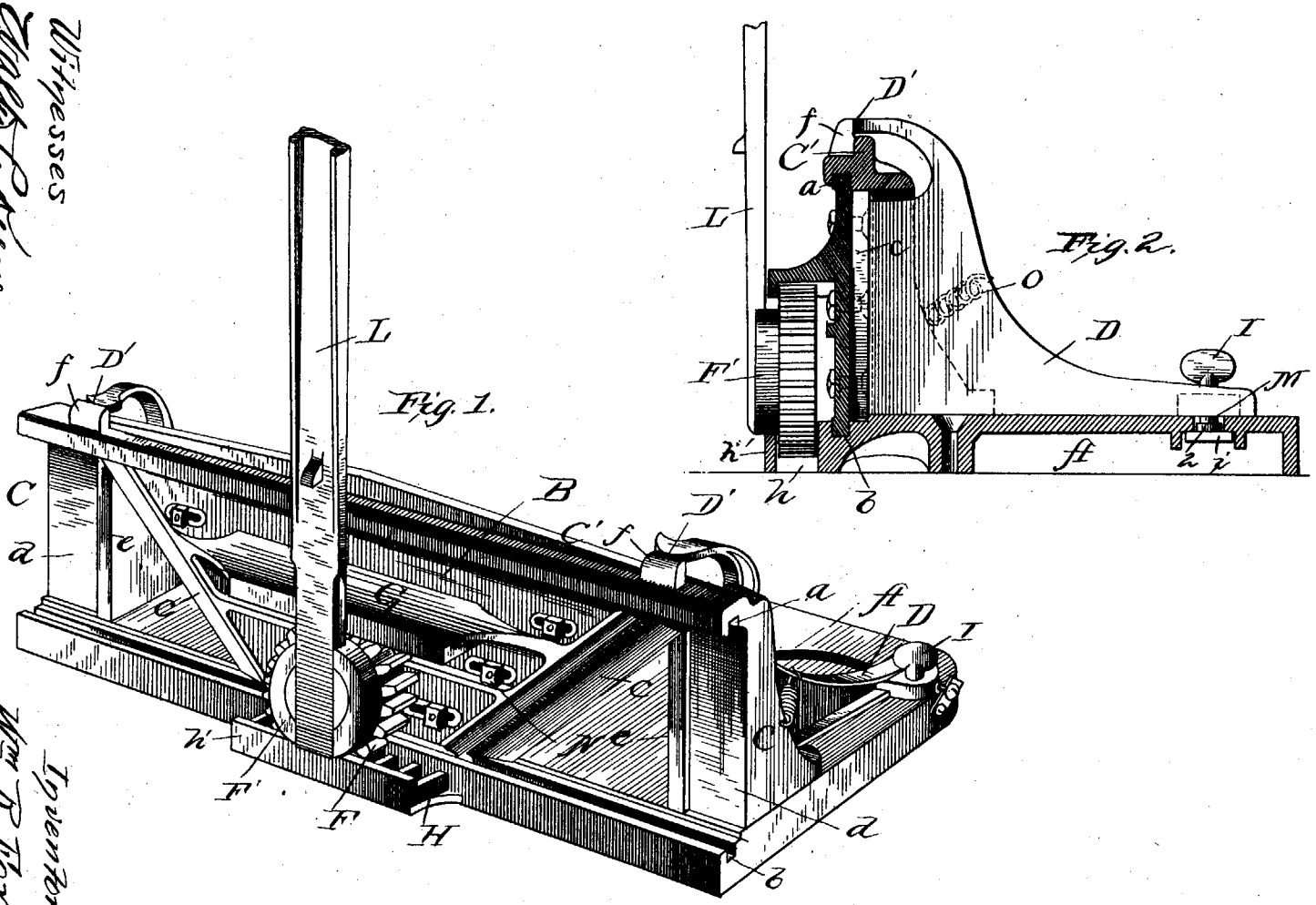
Witnesses
Walter P. Keene
F. L. Middleton
Inventor.
Wm. R. Fox.
By Reid & Lear
Attys.
N. PETERS, Photo-Lithographer, Washington, D. C.

2 Sheets—Sheet 2.

W. R. FOX.

MITER CUTTING MACHINE.

No. 11,062. Reissued Feb. 25, 1890.

Witnesses

Walter P. Keene.

F. L. Middleton

Inventor.

William R. Fox, by Ellis Spear

Atty.

N. PETERS, Photo-Lithographer, Washington, D. C.

UNITED STATES PATENT OFFICE.

WILLIAM R. FOX, OF GRAND RAPIDS, MICHIGAN.

MITER-CUTTING MACHINE.

SPECIFICATION forming part of Reissued Letters Patent No. 11,062, dated February 25, 1890.

Original No. 393,970, dated December 4, 1888. Application for reissue filed August 30, 1889. Serial No. 322,477.

*To all whom it may concern:*

Be it known that I, WILLIAM R. FOX, a citizen of the United States, residing at the city of Grand Rapids, in the county of Kent and State of Michigan, have invented certain new and useful Improvements in Miter-Cutting Machines; and I do hereby declare that the following, when taken in connection with the accompanying drawings and the letters of reference marked thereon, is a full, clear, and exact description of the same, which said drawings constitute a part of this specification.

The object of the invention is to produce a simple, cheap, and accurately-working machine, and adapted to be adjusted readily and with certainty; and it consists in the devices and combination of devices, as hereinafter more fully set forth.

Figure 1 is a perspective view of my improved miter-cutting machine, showing the position of the lever, lower rack-bar, pinion, and cutting-knives. Fig. 2 is a vertical sectional view of the same, the pinion and lever being in elevation. Fig. 3 is a plan view showing the adjustable gages with a part of the knife and its carriage in section, the rack-bar being shown in dotted lines.

A represents the bed of the machine, which is constructed, preferably, of metal.

B represents the carriage, which is constructed so as to move in longitudinal ways *a b*, and to which are attached the knives *c c*.

C is the upright frame supported upon the bed A, and may be, if desired, made integral with the same. This frame consists of two corner-posts *d d* at each end of the frame, with a connecting-bar between the two, (indicated at C′,) the upper way in which the carriage runs being formed in the overhanging part of this bar, as shown. This bar is formed integral with the corner-posts, or may be made independent thereof and secured thereto.

D D are the gages, arranged one at either end of the machine, as shown in Fig. 3. These gages are adjustable in a curved slot formed in the bed-plate, the gages being guided in their movement by a pin projecting from the gages into the slot, with a bearing-plate connected upon the other side, as shown in Fig. 2 at 2. The gages are formed with plane faces, and the edges nearest the center are arranged in proximity to the plane of movement of the cutting-knives, so that these edges which I have marked *e* act in conjunction with the knives to form a shear cut. The edges of the gages nearest the ends of the frame bear against the end posts, which serve as a lateral support both at the upper and lower parts of the front edge to sustain the gage against the cutting action of the knife. The gages have a cut-away portion at their upper ends, as shown in Figs. 1 and 2, terminating in a curved arm having a semicircular bearing-face which is in bearing contact with a projection *f* on the cross-bar of the frame. Thus each gage has two bearings at its inner edge.

*c c* are knives attached to the carriage by means of bolts and nuts passing through the slots shown in the drawings by N N. These slots N N are preferably made in the form shown in order to allow of lateral adjustment for the knives.

F is a gear or cog wheel arranged between the carriage and bed, with its cogs engaging with the rack G upon the carriage, and also with the rack H upon the bed. The rack H is provided with the openings *h*, in order to allow any shavings or dust which may drop thereon to fall through out of the way, thereby preventing clogging. The lever L is attached to the gear F in any suitable manner; but I prefer to have it constructed to fit into a dovetailed slot or groove in a projection upon said gear, which projection is shown at F′. This projection F′ is circular in form and rests upon the way or guide *h′*, *h′* being a horizontal way formed upon the rack H and holds the gear F at a proper distance from the rack.

I is a thumb-screw passing through the end of the gage D, and also through the slot M into a block or nut *l*, by means of which the said gage is adjusted to any required angle, the slots M being circular in form, as shown in Fig. 3.

J is a set-screw on the outer rear end of the gage, which strikes against a movable button K on the bed to limit the movement of the gage.

The gages D D may be set from a right angle to the knives inwardly, so as to cut the stock at any required angle, and, if desired, may be set outwardly beyond a right angle by withdrawing the button K from the path of the stud J. This stud J tends to limit the rearward movement of the gage when the button K is in its path, the spring O tending to keep the gage in its position at right angles to the line of cut. The gages D D are held at the end next to the knives by means of the springs O and against lugs *f f*, which lugs may be formed on the bar C′. The end of each gage resting against the projections is semicircular, as before described, and is shown at D′, these circles being struck from a center directly over and in line with the inner edge *e* of the gage. The gage is set so that this edge *e*, which, as described, acts with the knife to form a shear cut, is in the proper position to so act without coming in contact with the knife, and as the inner end turns on its circular bearing, of which the edge *e* is the center, it will be seen that the relative position of the edge *e* and knife remains the same no matter what angle the edge may assume.

The construction and operation of the parts are clearly illustrated in Figs. 2 and 3. That part of the end of the gage which forms the bearing-face is shown in the upper part of Fig. 2, and the curve of this face may be seen more clearly on the right hand of Fig. 3, both these figures showing clearly the opposite bearing-face of the projection *f*, against which the face D′ rests. The curve of the face on the end of the gage is made sufficient in extent to allow the required swing of the gage. The edge *e* is one corner of the inner end of the gage, as shown on the left hand of Fig. 3, where the upper part with the curved bearing-face is broken away to show the said edge, and as the center of the curved bearing-face is in line with this edge, however the gage may turn, the center will always be the same distance from the opposite face or fixed part of the frame on which it bears, and therefore always in the same relation to the path of the knife. The edge *e*, being in line with this said center, also bears uniformly the same relation to the edge of the knife and supports the material acted upon in the same manner and to the same extent, whatever may be the angle of the gage.

O′ represents the point of attachment of the spring O to the frame, and $O^2$ the point of attachment of the spring O to the gage. The spring O can be dispensed with and my gage will still operate; but I find that it works much more conveniently with the spring, as it keeps the inner ends of the gages pressed closely against their bearings.

The operation of my invention is as follows: The stock to be operated upon is placed upon the bed and against the gage D, the end of it passing through between the upright line *e* of the gage and the knife *c*. The knife *c* is then carried forward by means of the lever L, cutting the stock at the angle indicated upon the bed, which may be indicated by lines, as shown in Fig. 3. These lines may be marked either upon the edge of the bed, as shown, or upon the slotted areas M M. For convenience I construct my device double, so that it may be operated in either direction, and the two gages may be set so that one is the complement of the other, if desired. By means of this device wood or other similar material may be readily and quickly cut upon any desired angle. By adjusting the gages by means of the thumb-screws the angle upon the wood will correspond to the angle to which the gages are adjusted. The cutters are attached to the carriage, so as to be readily removed or set, as occasion may require. It will be understood that one of the cutters may be dispensed with; but I consider two as desirable.

I do not wish to be understood as broadly claiming a bed with guides thereon to locate the work and a sliding cutter to cut the work upon the angle indicated by said gages, as I am aware that miter-cutters of various kinds have heretofore been used embodying such device; but

What I claim to have invented, and desire to secure by Letters Patent, is—

1. In combination, the bed, the knife moving on suitable ways, an adjustable gage having a shearing-edge, and two independent bearings for its inner end, said bearings being in different directions, whereby the shearing-edge is always held in the same relation to the knife, substantially as described.

2. In a miter-cutting machine, a knife moving in suitable ways, an adjustable gage provided with an edge *e*, arranged to act in connection with the knife to form a shear cut, a bearing on said gage having its face forming a part of a circle the center of which is in line with the edge *e*, and an opposite bearing therefor on the frame, whereby the gage is always held in the same relation to the knife, substantially as described.

3. In a miter-cutting machine, the combination, with a carriage arranged on a bed in longitudinal ways carrying a cutting-knife, of an adjustable gage provided with an edge *e*, acting in connection with the knife to form a shear cut, and having a semicircular bearing struck from the edge *e* of the gage as a center, whereby the said gage is always in the same relative position to the cut of the knife, substantially as described.

4. In a miter-cutting machine, the combination, with the upright frame and the cutting-knife, of an adjustable gage having an upper circular bearing and two parallel edges, one edge adapted to rest against the upright frame and the other edge *e* forming the center of the curve upon which the upper bearing-edge is struck, whereby the edge *e* is adapted to remain parallel with the cutting-knife, and arranged in such proximity thereto as to form with such knife a shear cut, substantially as described.

5. In a machine for cutting miters, the combination, with the cutting-knife, of a gage having an edge *e* and a circular bearing and a plate or bearing-face therefor on the machine-frame, the circle of the bearing being struck from the edge *e* as a center, whereby said edge is always maintained in the same relative position to the knife, substantially as described.

6. In a miter-cutting machine, the combination of the adjustable gage, the upright frame, the connecting-spring between the gage and frame, and a lug or projection on said frame, said gage having a circular bearing adapted to rest against the said lug, substantially as described.

7. The combination, in a miter-cutting machine, of the base having a curved slot and an upright frame, a knife arranged to move in a longitudinal way on said frame, a gage adjustable in the curved slot, having a front edge arranged to form with the knife a shearing-edge and to bear laterally against a post on the base, and a projection on the frame arranged in front of the line of said shearing-edge of the gage to hold the said edge in the same relation to the knife at whatever angle the gage may be placed, all substantially as described.

8. In a miter-cutting machine, the combination of the bed-plate, the upright frame mounted thereon, the gage D, the spring O between the frame and the gage, a circular bearing D′ on the gage, and the lug *f* on the frame for the circular bearing, substantially as described.

WILLIAM R. FOX.

Witnesses:

CHAS. F. ROOD,

WM. H. MUIR.